United States Patent Office 3,061,494
Patented Oct. 30, 1962

3,061,494
PROCESS OF CHEMICAL MILLING AND ACID AQUEOUS BATH USED THEREFOR
Herman Ben Snyder, Seattle, and Forrest Keith Spencer, Bremerton, Wash., assignors to Boeing Airplane Company, Seattle, Wash., a corporation of Delaware
No Drawing. Filed Oct. 5, 1959, Ser. No. 844,218
2 Claims. (Cl. 156—18)

This invention relates to chemical milling, and more particularly to chemical milling in an acid medium using principally an oxidation-reduction process.

In the past, metals have been shaped by cutting tools of various types, and the process has been known as machining or milling. However, the shapes and the tolerances required for modern airplanes, missiles, etc. have become so complex and exacting that mechanical milling methods are proving to be extremely expensive and very difficult to accomplish.

Recently, a method of milling metals by chemical means, know as "chemical milling," has been developed in which sizable selected portions of metal members are removed by chemical means. Chemical milling should be distinguished from prior chemical processes such as pickling, brightening or polishing, surface increase, and pictorial or design etching. Pickling is a process by which scale (frequently metallic oxides) is removed from the surface of metal, but as little metal as possible is removed. Brightening or polishing refers to a process in which a minimum amount of metal is removed to give a smooth or reflective surface. Surface increase is a roughening process in which a metallic surface is pitted or selectively etched, but in which only a very small amount of metal is removed. Etching in design and photoengraving and in the graphic arts in general is a process in which very small amounts, usually to a depth of a few thousandths of an inch, of metal are removed in a very precise and accurate manner. The metal removal must be sharp and vertical and the etching is a painstaking process.

Chemical milling, however, removes large quantities of metal over comparatively wide areas. For example, metal may be removed to a depth of a half an inch or more. Also the steepness or accuracy of the slope of the edge of the removal area is not critical. Chemical milling is made selective by masking the areas that are to remain and subjecting the unmasked areas to chemical attack.

Prior art methods of chemical milling involved the use of caustic (basic) etchants and, more recently, acid etchants. Certain solutions have been found to be effective for certain metals. In our work an attempt was made to chemically mill a low alloy steel known as SAE 4130, the composition of which is shown in Table III below. We found that prior art chemical milling solutions were not satisfactory because of excessive surface roughness and/or intergranular attack.

Accordingly, it is an object of this invention to provide an improved method of chemical milling.

It is another object of this invention to provide an improved method of chemical milling in an acid medium.

It is a further object to provide an improved method of chemical milling in an acid medium using principally an oxidation-reduction process.

It is an additional object to provide an improved method of chemical milling which may be done at a relatively uniform and controllable rate.

It is an auxiliary object to provide an improved method of chemical milling suitable for use of steels, such as low alloy steels, high carbon steels, sainless steels, etc., brass, bronze, copper, titanium, titanium alloys and other metals.

It is still another object to provide improved chemical milling solutions for accomplishing the above objects.

It is a still further object to provide a chemical milling solution in which most of the components may be mixed in solid form and then stored or transported for long periods of time without danger of deterioration.

These and other objects of this invention will be apparent from the following description.

Certain chemical milling solutions used in the prior art involve removing metal by acid attack. However, the components of these solutions are dangerous to handle, particularly in a manufacturing operation. Therefore, we have attempted to utilize an entirely different approach in obtaining the composition of a chemical milling solution in that the solution removes metal principally by oxidation-reduction processes. As finally evolved after considerable research, the chemical milling solution of our invention includes hydrogen ion, ferric ion, stannic ion, chloride ion, fluoride ion, nitrate ion and oxalate ion, all of which are necessary and, we believe, perform specific functions as discussed below. Also as discussed below, acetate ion may be desirable in some instances, but is not absolutely necessary. To provide these ions and to set forth the limits of the composition of the solution, we have used the following materials.

Table I

| Material: | Percent by weight |
|---|---|
| Nitric acid (70%) ($HNO_3$) | 10–50 |
| Stannic chloride ($SnCl_4$) | 2–10 |
| Sodium bifluoride ($NaHF_2$) | 2.5–15 |
| Ferric chloride (42° Baumé) ($FeCl_3$) | 2.5–20 |
| Oxalic acid (COOHCOOH) | 0.1– 5 |
| Acetic acid ($CH_3COOH$) | 0– 5 |
| Water | 25–60 |

Our invention should not be limited to the particular materials or particular strengths (such as 70% nitric acid or 42° Bé. ferric chloride) set forth in Table I, as those materials are merely regarded as suitable for supplying the above-mentioned ions. The concentration limits of the above-mentioned ions (namely hydrogen ion, ferric ion, stannic ion, chloride ion, fluoride ion, nitrate ion, oxalate ion and acetate ion) should correspond to those obtained by solutions of the materials of Table I within the limits set forth in Table I.

As mentioned previously, the particular problem to be solved originally was that of successfully chemical milling SAE 4130 steel. Among the many solutions we investigated in our research on this material, solutions A through D are set forth below.

A

| Material: | Percent by weight |
|---|---|
| KF | 15 |
| $SnCl_4$ | 10 |
| HCl | 25 |
| $H_2O$ | 50 |

B

| Material: | Amount |
|---|---|
| $NH_4HF_2$ | gm__ 50 |
| $SnCl_4$ | gm__ 50 |
| HCl | ml__ 150 |
| $NaHF_2$ | gm__ 30 |
| $H_2O$ | ml__ 300 |

C

| Material: | Amount |
|---|---|
| $NaFH_2$ | gm__ 50 |
| $SnCl_4$ | gm__ 30 |
| $HNO_3$ | ml__ 110 |
| $CCl_3COOH$ | gm__ 10 |
| $H_2O$ | ml__ 200 |

D

| Material: | Amount |
|---|---|
| $NaHF_2$ | gm 100 |
| $SnCl_4$ | gm 60 |
| $HNO_3$ | ml 200 |
| $CCl_3COOH$ | gm 20 |
| $H_2O$ | ml 400 |

These solutions each omit one or more of the necessary ions of our invention, and each solution gave unsatisfactory results.

Solution A exhibited no appreciable attack on SAE 4130 steel and led to the formation of "smut" (discussed below) on the metal article. Solution B exhibited extremely slow attack on SAE 4130 steel. Solution C, while providing a surface between 20 and 60 R.M.S. (see below) on SAE 4130 steel, had a very slow milling rate of from about 0.1 to 0.2 mil per minute per exposed side at temperatures between 120° F. and 140° F. This milling rate was not stable. Solution D produced results similar to solution C and gave a surface between 20 and 40 R.M.S. Other solutions were tried with unsatisfactory results.

Finally, after many tests, a solution having the composition set forth in Table II was found to be preferred for SAE 4130 steel, although other solutions within the limits of Table I would be operable.

Table II

| Material: | Percent by weight |
|---|---|
| Nitric acid (70%) | 38.4 |
| Stannic chloride | 7.5 |
| Sodium bifluoride | 6.3 |
| Ferric chloride (42° Baumé or equivalent) | 10.0 |
| Oxalic acid | 1.8 |
| Acetic acid | 2.8 |
| Water | 34.0 |

We have found that the particular solution set forth in Table II will also successfully chemically mill a number of other steel alloys, and with modifications in the percentages of the ion concentrations used within the limits of Table I, will successfully mill all steels including all the so-called low alloy steels, the so-called high carbon steels, stainless steels, precipitation hardening steels, etc., as well as titanium alloys, Inconel-X, brass, bronze, copper and other metals. In particular, the metals set forth in Table III have actually been milled very successfully.

The results on the various materials in Table III have been excellent. Many tests were made with different solutions on different metals. For example, the solution of Table II was tested on the certain metals with the results shown in Table IV.

Table IV

| Metal | Temperature, °F. | Rate of metal removal mils/min/ side | R.M.S.[1] finish |
|---|---|---|---|
| SAE 321 | 130 | 1+ | 15 |
| SAE 1020 | 138 | 1.5 | 60 |
| SAE 4130 | 80–120 | Up to 2.0 | 20–60 |
| SAE 4340 | 80–120 | Up to 2.0 | 40–60 |
| 6Al-4Va-Ti | 150–160 | 1+ | Mirror |
| AM 350 | 150 | 0.7 | 40 |
| 17-7 PH | 130 | 1+ | 40 |
| 19-9 | 120 | 1+ | 40 |
| SAE 304 | 120 | 1+ | 40 |
| SAE 9310 | 120 | 1+ | 30 |
| Copper | 120 | 1+ | 20 |
| Brass | 120 | 1+ | 20 |
| 15-7 PH | 110–120 | 1.0 | 20–40 |

[1] The smoothness of milled metal is expressed in "root mean square" terms, abbreviated R.M.S., and the unit of measurement is micro inches of amplitude of surface variation.

After many tests we have determined that a solution within the equivalent ion concentrations set forth in Table I is operable for milling all the materials mentioned, but in many instances speed of milling, uniformity, surface finish, temperature and other factors will determine the particular composition of the solution which will work best for milling a particular material.

As mentioned above, we believe that each of the ions of our solutions perform a definite function, and we have found that if any of these ions are omitted from the solution, satisfactory results are not obtained. While we do not wish to be limited to our present beliefs, and do not wish to have our invention stand or fall on our concept of the functions of the various components of the solutions involved, we do feel that the following functions of these components are correct.

In particular, the nitric acid performs a function of oxidizing agent of the milling solution, and when the nitric acid is combined with the water, hydrogen ion and nitrate ion are formed initially. The hydrogen ion contributes Table III

| | C | Mn | Si | Cr | Ni | Mo | P[1] | S[1] | Fe | Al | W | Ti | Cb & Ta | Cu | N |
|---|---|---|---|---|---|---|---|---|---|---|---|---|---|---|---|
| Low alloy steels: | | | | | | | | | | | | | | | |
| SAE 4130 | 0.28–0.33 | 0.40–0.60 | 0.20–0.35 | 0.80–1.10 | | 0.15–0.25 | 0.040 | 0.040 | Bal. | | | | | | |
| SAE 4340 | 0.38–0.43 | 0.60–0.80 | 0.20–0.35 | 0.70–0.90 | 1.65–2.00 | 0.20–0.30 | 0.040 | 0.040 | Bal. | | | | | | |
| High carbon steels: | | | | | | | | | | | | | | | |
| SAE 1020 | 0.18–0.23 | 0.30–0.60 | | | | | 0.040 | 0.050 | Bal. | | | | | | |
| SAE 9260 | 0.55–0.65 | 0.70–1.00 | 1.8–2.2 | | | | 0.040 | 0.040 | Bal. | | | | | | |
| SAE 9310 | 0.08–0.13 | 0.45–0.65 | 0.20–0.35 | 1.00–1.40 | 3.00–3.50 | 0.18–0.15 | 0.025 | 0.025 | Bal. | | | | | | |
| Stainless steels: | | | | | | | | | | | | | | | |
| SAE 304 | [1] 0.08 | [1] 2.00 | [1] 1.00 | 18.0–20.0 | 8.00–11.00 | | | | Bal. | | | | | | |
| SAE 305 | [1] 0.12 | [1] 2.00 | [1] 1.00 | 17.0–19.0 | 10.0–13.0 | | | | Bal. | | | | | | |
| SAE 316 | [1] 0.10 | [1] 2.00 | [1] 1.00 | 16.0–18.0 | 10.0–14.0 | 2.00–3.00 | | | Bal. | | | | | | |
| SAE 321 | [1] 9.08 | [1] 2.00 | [1] 1.00 | 17.0–19.0 | 8.0–11.0 | | | | Bal. | | | | (²) | | |
| AM 350 | 0.10 | 0.90 | 0.40 | 17.0 | 4.0 | 2.75 | | | Bal. | | | | | | 0.10 |
| 17-7 PH | 0.07 | 0.60 | 0.40 | 17.0 | 7.0 | | | | Bal. | 1.15 | | | | | |
| 15-7 PH | 0.07 | 0.60 | 0.40 | 15.0 | 7.0 | | | | Bal. | 1.15 | | | | | |
| 19-9 | 0.30 | 1.25 | 0.55 | 19.0 | 9.0 | | 0.04 | 0.03 | Bal. | 1.50 | 1.25 | 0.10–0.75 | 0.04 | 0.15 | |
| 17-4 PH | [1] 0.08 | [1] 1.0 | [1] 1.0 | 15.5–17.5 | 3.0 | | 0.04 | 0.04 | Bal. | | | | 3–5 | | (³) |
| Super alloy: Inconel-X | 0.04 | 0.50 | 0.40 | 15.0 | 13.0 | | | | 7.0 | 0.7 | | 2.5 | | | (⁴) |
| Titanium: 6 Al-4V-Ti | | | | | | | | | | 6 | | Bal. | | | (⁵) |
| Copper | | | | | | | | | | | | | | | |
| Brass | | | | | | | | | | | | | | | |

[1] Maximum.   [2] Ti min. 5 times C.   [3] Co+Ta/0.45 maximum.   [4] Cb/1.0.   [5] V/4.

directly to the chemical attack on the metal. The nitrate ion undergoes a secondary change and breaks down during the milling operation forming NO, $NO_2$, $N_2O_3$ and $N_2O_5$ gases which dissolve in the solution. The presence of these dissolved gases in the solution contributes to the oxidation potential of that solution.

We have found that if the concentration of the nitrate ion is above the equivalent concentration set forth in Table I, a condition known as "passivation" occurs which makes the metal to be milled relatively inert to the milling solution. It is probable that passivation involves the formation of an oxide layer on the surface of the metal which acts as a barrier to decrease the flow of active components in the milling solution to the surface of the metal. If the concentration of the nitrate ion is below the equivalent concentration set forth in Table I, the milling rate becomes extremely low and the process is too time consuming to be effective.

We have found that hydrofluoric acid, the alkali metal bifluorides ($AHF_2$), other metal bifluorides (including ammonium bifluoride), and fluorides in general if they are soluble in the particular solution involved, are satisfactory suppliers of fluoride ion. Some of these materials also provide hydrogen ion. The fluoride ion is very important in that it acts to active the metal surface which in turn allows the reaction to proceed in the desired manner.

The fluoride ion also has another valuable function. In chemical milling processes frequently a material known as smut is formed, which actually clings to the metal itself. This smut is usually an oxide of the metal being milled, or is a chemical compound of that metal with solution components or unreacted finely divided particles of the base alloy. The smut is usually attracted to the base metal by electrochemical and/or electrostatic forces. We have found that the fluoride ion acts as a "smut conditioner" and that with the fluoride ion in the solution, the smut can be easily removed by rinsing. However, if the fluoride ion is not present in the quantity set forth in Table I, the smut is very difficult to remove and frequently interferes with the milling action. If the fluoride ion is present in a quantity above that set forth in Table I, the attack on the metal to be milled becomes too violent to control properly.

The stannic and ferric ions are necessary to the solution because they are the media through which the principal oxidation-reduction action takes place. In steels, the elemental iron in the metal being milled is oxidized to ferrous iron while the stannic and ferric ions are reduced to stannous and ferrous ions, respectively. Without the stannic and ferric ions, a true oxidation-reduction type metal removal reaction would not be possible. Also, the stannic ion acts in a manner to cause the milling solution to polish the surface of the milled material rather than allowing intergranular attack which would produce a dull and rough surface. The stannous and ferrous ions produced by the above reaction tend to be reoxidized to stannic and ferric ions by the previously mentioned oxides of nitrogen which were dissolved in the solution. If the concentration of stannic ion is above that of Table I, the milled metal is pitted and if the concentration of stannic ion is below that of Table I, there is a loss of luster in the finish of the milled metal.

The chloride ion performs the function of suppressing the chemical reaction rate. That is, it allows the desired chemical reactions to take place in the solution at a reasonable rate without losing control of these reaction rates. Also, the chloride ion aids in reoxidizing the ferrous and stannous ions to their ferric and stannic forms, respectively. In addition, the chloride ion promotes attack on inclusions, inter-metallic alloys, etc. in order to give a more uniform milling action.

The oxalate ion is believed to form various complexes (such as metal-organic-fluoride) with the other chemicals of the solution. These complexes then disassociate and furnish chemicals to the reaction as they are needed. Consequently, no loss in the milling rate or milling characteristics is noticed until the solution is almost completely exhausted. Also, the oxalate controls the character of certain precipitates formed making them fairly water soluble and granular. For example, if insufficient oxalate is available, the precipitates formed are very fine and appear to be insoluble mixtures of ferric oxide and ferric fluoride. The oxalate seems to keep this precipitate from precipitating on the parts being milled and as mentioned above, tends to cause the formation of a fairly water soluble granular precipitate.

We have also found that a wetting agent is frequently desirable in order to reduce the surface tension of the solution which in turn prevents pitting, uneven milling rates and a process known as "gas cutting." If a wetting agent is not utilized, frequently gas bubbles form on the surface of the metal which prevents that portion of the surface from reacting with the solution, thereby causing the formation of an uneven surface. Suitable wetting agents include alkyl aryl sulfonates such as dodecyl benzene sulfonate.

As mentioned previously, frequently acetate ion from an acetate ion supplier such as acetic acid, trichloroacetic acid, alkali metal acetate, ammonium acetate or other metallic acetate is desirable to depress the excess loss of the fluoride ion. While not absolutely required, its addition will help stabilize the solution and the milling action.

As pointed out previously, this solution reacts primarily in an oxidation-reduction manner and is not an acid-type action. This is indicated by the fact that an analysis of the gases liberated during the milling reaction shows that only 10% to 25% of the theoretical volume of gas that would normally be formed by acid attack is released by our solution. Furthermore, only 80% of the gas that is released is hydrogen. From 2% to 4% of the released gas is carbon dioxide, and the remainder is made up of the oxides of nitrogen from $N_2O$ to $N_2O_5$.

In actual operation a part to be chemically milled is cleaned and degreased and then covered by a suitable maskant such as the known neoprene or vinyl materials. In some instances, a photo-sensitive material such as polyvinyl alcohol may be utilized. Certain portions of the maskant are removed by mechanical means or by photographic means, and then the part is immersed in the milling solution. The milling solution attacks the unmasked portions of the metal part.

As mentioned previously, our solution provides a uniform milling rate and therefore the depth of material removed may be accurately controlled. However, in order to obtain uniform milling, the concentration of the solution should be constant and should not vary within the different portions of the tank. Therefore, agitation of the solution is required. This agitation should be non-directional (such as that provided by a rolling motion) and must be great enough to prevent local variations of concentration and temperature. Also the agitation must be controlled in order to prevent excessive part oscillation and/or excessive surface movement of the solution with of course the attendant losses and/or foaming. This agitation may be provided by bubbling air through the solution or by suitable mechanical means.

We have also found that the part itself should be agitated for good uniform results. This agitation will minimize or prevent gas cutting and so called "dishing" (etching on a part of the metal more than desired, for example in the form of a dish). Also the part agitation minimizes the problem which is sometimes caused by scratches on the surface, namely the milling in some instances may retain the scratch by etching the scratched portion at the same rate as the other portion. This part agitation tends to remove many existing scratches and provides a smooth surface. The part agitation also gives greater surface smoothness and permits the attainment of closer tolerances.

Our solution can be operated between the temperatures of from 60° F. to 170° F. and, by varying the temperature and the concentration of the solution within the limits of Table I, the milling rates may be varied to removal from almost 0 to about 3 mils per side per minute. Our solution also gives excellent line definition when the proper agitation is used. The life of our solution is quite long and the milling rate remains constant throughout the life of the solution. Specifically, we have found that between one and two pounds of metal can be removed per gallon of solution before the milling properties are affected.

Regeneration of the solution may be readily accomplished by the addition of water, nitric acid, and the above mentioned bifluorides, fluorides, or hydrofluoric acid. This regeneration is necessary occasionally to compensate for evaporation and for the loss of the chemicals involved.

Also, our solution does not form the insoluble precipitates which were a frequent disadvantage with prior art chemical milling solutions.

Another advantage of our solution is that the materials, with the exception of nitric acid, may be mixed in a dry form and may be stored and handled easily. This reduces the hazard of mixing the solution components and simplifies the actual use in manufacturing operations.

While the present invention has been shown in a few forms only, it will be obvious to those skilled in the art that it is not so limited but is susceptible to various changes and modifications without departing from the spirit and scope thereof.

We claim as our invention:

1. An acid aqueous solution for chemical milling, principally by an oxidation-reduction process, said solution including the following ingredients (percentages by weight): hydrogen ion and nitrate ion in concentrations corresponding to that obtained in a solution containing from about 10% to about 50% of nitric acid (70%), stannic ion in a concentration corresponding to that obtained in a solution containing from about 2% to about 10% of stannic chloride, ferric ion in a concentration corresponding to that obtained in a solution containing from about 2.5% to about 20% of ferric chloride (42° Bé.), chloride ion in a concentration corresponding to that obtained in a solution containing said amounts of stannic chloride and ferric chloride, fluoride ion in a concentration corresponding to that obtained in a solution containing from about 2.5% to about 15% of sodium bifluoride, oxalate ion in a concentration corresponding to that obtained in a solution containing from about 0.1% to about 5% of oxalic acid and acetate ion in a concentration corresponding to that obtained in a solution containing from 0% to about 5% of acetic acid.

2. A method of chemical milling an article, principally by an oxidation-reduction process, said method including the step of treating said article in an acid aqueous chemical milling solution having a temperature of from about 60° F. to about 170° F., said chemical milling solution including the following ingredients (percentages by weight): hydrogen ion and nitrate ion in concentrations corresponding to that obtained in a solution containing from about 10% to about 50% of nitric acid (70%), stannic ion in a concentration corresponding to that obtained in a solution containing from about 2% to about 10% of stannic chloride, ferric ion in a concentration corresponding to that obtained in a solution containing from about 2.5% to about 20% of ferric chloride (42° Bé.), chloride ion in a concentration corresponding to that obtained in a solution containing said amounts of stannic chloride and ferric chloride, fluoride ion in a concentration corresponding to that obtained in a solution containing from about 2.5% to about 15% of sodium bifluoride, oxalate ion in a concentration corresponding to that obtained in a solution containing from about 0.1% to about 5% of oxalic acid and acetate ion in a concentration corresponding to that obtained in a solution containing from 0% to about 5% of acetic acid.

References Cited in the file of this patent

UNITED STATES PATENTS

| | | |
|---|---|---|
| 1,939,241 | Taylor | Dec. 12, 1933 |
| 2,266,430 | Matthews et al. | Dec. 16, 1941 |
| 2,572,228 | Whyzmuzis | Oct. 23, 1951 |
| 2,806,000 | Streicher | Sept. 10, 1957 |
| 2,809,138 | Wagner | Oct. 8, 1957 |
| 2,890,944 | Hays | June 16, 1959 |
| 2,940,838 | Snyder et al. | July 14, 1960 |
| 2,981,610 | Snyder et al. | Apr. 25, 1961 |